Dec. 28, 1965  R. E. BRUMBACH  3,225,972
FLUID DISPENSER
Filed Jan. 13, 1964  2 Sheets-Sheet 1
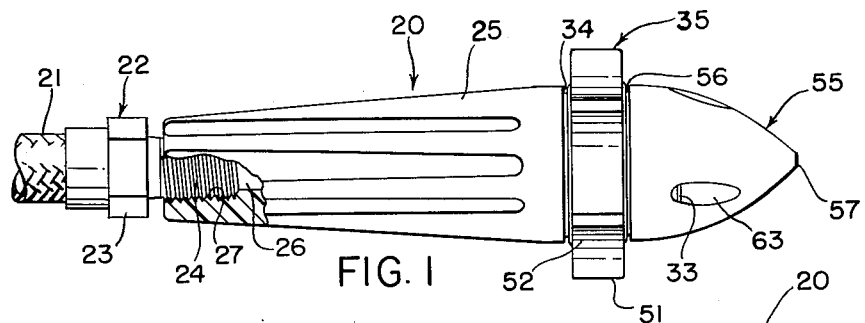
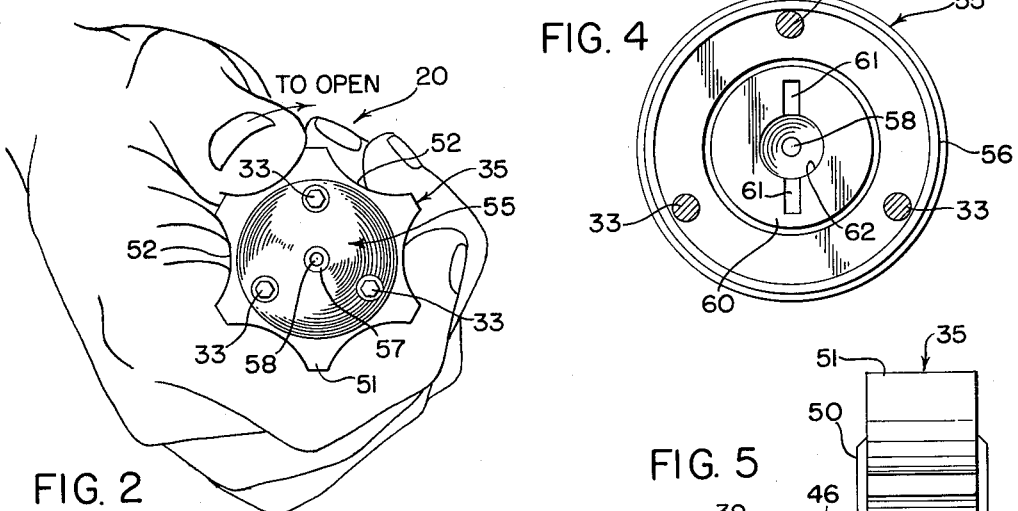
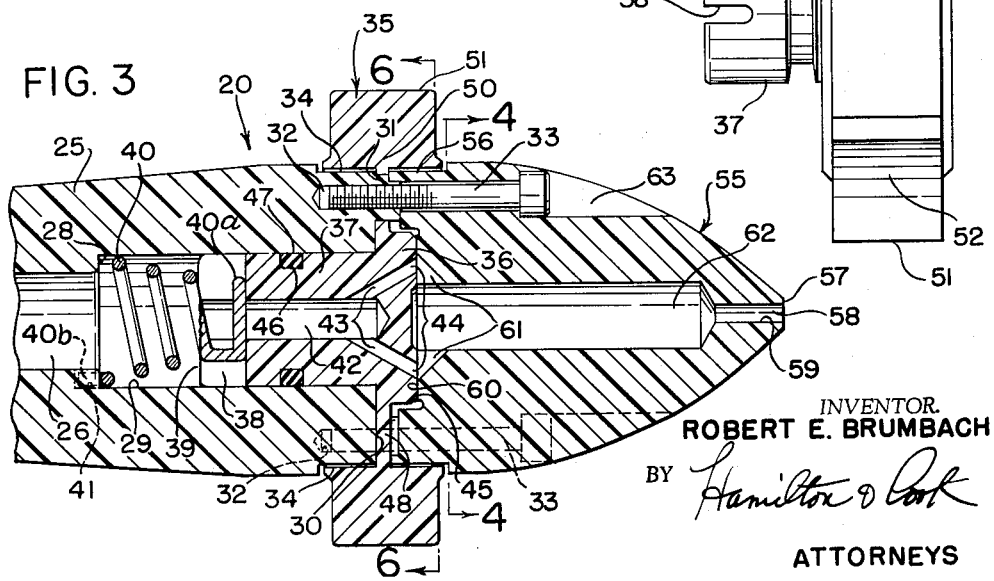
INVENTOR.
ROBERT E. BRUMBACH
BY
ATTORNEYS

United States Patent Office 3,225,972
Patented Dec. 28, 1965

3,225,972
FLUID DISPENSER
Robert E. Brumbach, Box 371, Mantua, Ohio
Filed Jan. 13, 1964, Ser. No. 337,286
7 Claims. (Cl. 222—516)

The present invention relates generally to improvements in equipment employed to deliver fluids under pressure. More particularly, the invention relates to improvements in air guns or blow guns which are used in industrial cleaning and similar applications. Specifically, the invention relates to an improved air gun which assures a convenient, durable, and reliably controllable means of delivery pressurized fluids.

The prior art has seen numerous forms and variations of blow guns or air guns for dispensing fluids in industrial applications. Most of these air guns have employed variations of the poppet valve to control the delivery of fluid. An inherent disadvantage of these valves is that they operate directly against the fluid pressure making them difficult to initially crack open. Once slightly open, the fluid flow results in a pressure reduction which causes the valve to assume the fully open position. Thus, reduced or intermediate flow rates are almost impossible to attain.

Another disadvantage of the poppet valve dispensers is that the valve seating materials commonly employed are prone to deterioration and eventual leakage. The valves, normally constructed of stainless steel or brass, engage a rubber seat. Frequently, the rubber seat is subject to wear, dirt buildup resulting in improper seating, or deterioration from reaction with water or oil which accumulate in the air lines. Normally, the valves are actuated either by push button or lever controls. The push button variety inherently gives poor control of the fluid delivery, and in some models the operator's fingers can be pinched between the push button and the housing. The lever type, while providing better regulation of the fluid flow, is extremely hazardous in that fingers or gloves can easily be caught or pinched under the lever arm. Further, reasonable mobility and convenience in use of the conventional or known dispensers having such radial projections dictates that a swivel fitting must be provided between the supply line and the dispenser.

Accordingly, a principal object of the present invention is to provide an improved fluid dispenser with an easily controlled graduated fluid flow.

Another object is to provide a fluid dispenser with a valve constructed of materials which are not subject to excessive wear and resist the deleterious effects of dirt, water, and oil which becomes entrapped in the supply line.

An additional object is to provide an actuating mechanism to control the fluid delivery without danger of inflicting injury on the operator by pinching or catching the user's fingers.

A further object is to provide a light weight fluid dispenser which is highly mobile in that it can be pointed in all directions without the necessity of a swivel coupling between the dispenser and the supply line.

These and other objects of the invention and advantages thereof will become apparent from the following description taken in conjunction with the accompanying drawings.

In the drawings:

FIG. 1 is a side view of a fluid dispenser according to the invention, partially broken away to show details of the supply line connection;

FIG. 2 is a front view of the fluid dispenser of FIG. 1, demonstrating the easy manual operation thereof;

FIG. 3 is an enlarged fragmentary section of the front portion of the fluid dispenser shown in FIG. 1;

FIG. 4 is a section taken substantially as indicated on line 4—4 of FIG. 3;

FIG. 5 is an enlarged side elevation of the control valve of the fluid dispenser of FIG. 1;

Figure 6:
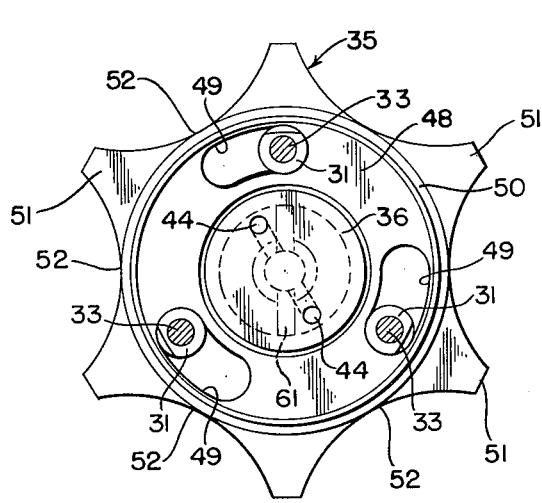
FIG. 6 is a section taken substantially on 6—6 of FIG. 3 with the control valve of FIG. 5 in the closed position.

A fluid dispenser according to the invention has a receiver portion, a control valve and a nozzle component. The receiver portion has an axial bore adapted at one end for connection to a fluid supply line. The other end of the receiver portion rotatably supports and partially houses a disk control valve. The control valve is torsionally spring loaded and is internally ducted and channeled to provide communication between the receiver bore and ports on the valve face. Radial projections from the valve assembly extending beyond the receiver allow selective, manual control of the valve. The nozzle component is attached to the receiver portion and also rotatably engages and partially houses the disk control valve. The nozzle component also has an axial bore for discharge of fluid. Elements of the disk control valve and the nozzle component define a valve seat so that controlled quantities of fluid will flow from the supply line, through the receiver and disk control valve, and out the nozzle bore.

The fluid dispenser, indicated generally by the numeral 20, is connected by a conduit or supply line 21 to a suitable source (not shown) of fluid such as air, a gas or a liquid under compression or pressure. The conduit 21 is attached to the dispenser 20 by an integral solid linkage or swivel connector 22. The connector 22 has a medial portion 23 preferably bevelled or hex-sided to receive a standard wrench. The end portion 24 of the connector 22 has exterior threads for connection to the dispenser 20.

Referring to FIGS. 1–5, the fluid dispenser 20 has an elongated tapered receiver portion 25. The smaller diameter end of the receiver 25 has an axial bore 26 with internal threads 27 at the outer end for mating engagement with the threaded portion 24 of a connector 22. The inner portion of bore 26 terminates at a shoulder 28 defining the inner end of a slightly larger diameter axial bore 29. The outer portion of bore 29 terminates at a face surface 30 on the larger diameter end of the receiver 25.

The face 30 of the receiver 25 carries a series of longitudinally directed or axially projecting studs or bosses 31 adapted for attachment of a dispenser nozzle portion to the receiver 25. As shown, there are three studs 31 symmetrically spaced around the receiver face 30. An axial tap 32 in each stud receives fasteners 33 for attachment of the dispenser nozzle portion as described below.

Adjacent the receiver face 30, the larger diameter end of the receiver 25 has a concentric cylindrical surface 34 for rotatably carrying or mounting the control valve 35. The control valve 35 has an axial hub 36 with an elongated stem 37 which fits snugly in the bore 29 of receiver 25. A radial slot 38 in the end surface 39 of the stem 37 rotationally restricts one end (40a) of a spring 40. A notch or indentation 41 in the bore shoulder 28 rotationally restricts the opposite end (40b) of the spring 40 allowing the spring to be torsionally loaded during assembly. The spring 40 is preferably constructed of a rust resistant spring steel.

The control valve stem 37 has an axial duct 42 extending from the end surface 39 into but not entirely or completely through the valve hub 36. One or more radially inclined or diverging channels 43 connect the terminal end of duct 42 with supply ports 44 on the circular face 45 of the valve hub 36. Two diametrically opposite inclined channels 43 and their respective ports 44 as shown in the drawings are representative of a structure meeting normal flow requirements while preserving the balance of the dispenser 20 for ease of hand operation. An exterior circumferential groove 46 in the stem 37 housing a standard rubber O-ring 47 prevents fluid escape around the stem and into the bore 29.

Extending radially outward from the juncture of the hub 36 and stem 37 of the control valve 35 is a relatively thin web 48. Oblong arcuate slots 49 in the web 48 accommodate the studs 31 projecting from the receiver face 30 so that the control valve 35 is radially fixed but rotationally free within the confines of the slots 49. Radially outwardly from the web 48, a rim 50 extends axially in opposite directions. A radially inner portion of the rim 50 engages the cylindrical surface 34 at the larger diameter end of receiver 25. Radial projections 51 extending outwardly from the rim 50 facilitate grasping for ease of hand operation. Although the projections 51 could have various shapes, the arcuate star-wheel configuration as disclosed has proven particularly satisfactory to allow random rotational orientation of the dispenser 20. The concave arcuate portions 52 between the projections 51 provide a plurality of surfaces around the circumference of the control valve 35 which are adapted for thumb or finger operation, as illustrated in FIG. 2.

The nozzle portion 55 of the fluid dispenser 20 is preferably bullet-shaped as shown having at the larger diameter end a concentric cylindrical surface 56, similar to the receiver surface 34, for rotatably carrying or mounting the control valve 35. The body of the nozzle 55 tapers to a small flattened or blunted discharge end 57 having a small diameter aperture or opening 58 at the outer end of a supply bore 59.

Radially inwardly of the surface 56, the face of the larger diameter end of nozzle 55 has a longitudinally inset circular valve seat 60 engaging the circular face 45 on the valve hub 36 to constitute a rotary disk valve. When the control valve 35 is actuated, as described in detail below, fluid under pressure passes from the receiver bore 29 through the valve ports 44 into suitably oriented and matching radial slots 61 on the valve seat 60. The slots 61, there being two shown one for each port 44, communicate with a large diameter axial bore 62 extending longitudinally through the nozzle 55 and communicating with the supply bore 59.

The fasteners or bolts 33, previously referred to, are received in suitable bores 63 located peripherally around the tapered surface of the nozzle 55 to countersink the fasteners 33 which are received in the taps 32 of the studs 31.

Figure 7:
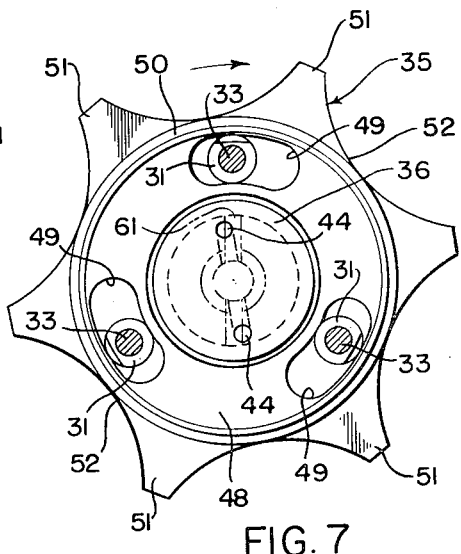
FIG. 7 is similar to FIG. 6, except that the control valve has been rotated in the manner depicted in FIG. 2 until the valve is in a partially open position.

Referring to FIGS. 6 and 7, selective manual actuation of the control valve 35 of the fluid dispenser 20 (in the manner depicted in FIG. 2) operates the rotary disk valve defined by the mating valve face 45 and valve seat 60. In FIG. 6, this "valve" is in the fully closed position with no fluid flowing from the receiver 25 to the nozzle 55. The torsion loaded spring 40 tends to rotate the control 35 counter-clockwise, so that the clockwise extremity of the slots 49 are firmly seated against the studs 31. The valve ports 44 are not aligned with the slots 61, so no fluid is introduced to the nozzle bore 62. Gradual, manual rotation of the control valve 35 (as indicated by the arrow in FIG. 2) selectively aligns the ports 44 with the slots 61, thereby providing a regulated flow of fluid. For special purposes where different graduations of fluid delivery are desirable, the ports 44 may be replaced by a series of holes of increasing size, triangular slots, or other configurations. FIG. 7 shows the valve in an approximately half-open position for the porting shown.

The receiver 25 and nozzle 55 components of the fluid dispenser 20, are preferably fabricated from a plastic material such as an acetal resin, manufactured by the E. I. du Pont de Nemours & Co. Inc. and distributed under the trademark Delrin. To achieve a frictional, well seated contact between the valve face 45 and the valve seat 60, it is preferred that these elements be of dissimilar materials. Therefore, if the nozzle 55 is an acetal resin, the control valve 35 should preferably be fabricated from a plastic material such as polyamide or nylon.

The fluid dispenser 20 described above is extremely versatile and may be utilized in a variety of installations. However, for installations where it is desirable to mount the fluid dispenser in an overhead or "pull-down" position, the form of fluid dispenser shown in FIG. 8 and indicated generally by the numeral 120 is advantageous in terms of operator convenience.

Figure 8:
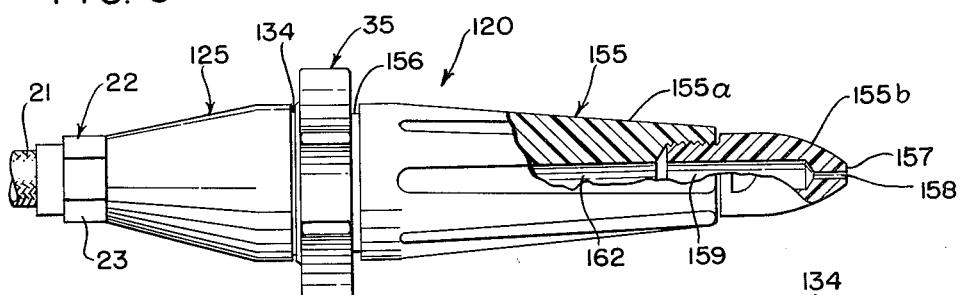
FIG. 8 is a side view of another form of the improved fluid dispenser, partially broken away to show details of the front portion.
Figure 9:
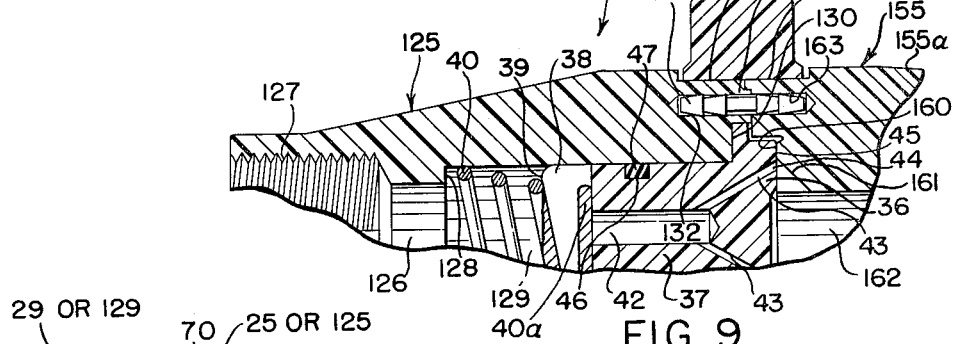
FIG. 9 is an enlarged fragmentary section of the fluid dispenser shown in FIG. 8; and, FIG. 10 is an enlarged detail of a fluid dispenser according to FIG. 9 showing a modified fluid seal.

Referring to FIGS. 8 and 9, the fluid dispenser 120 has a receiver portion 125 of shorter length than the receiver 25 of fluid dispenser 20 but otherwise similar. A conduit 21 is attached to the dispenser 120 by a connector 22 having exterior threads (not shown) engaging internal threads 127 at the outer end of an axial bore 126. The inner portion of bore 126 terminates at a shoulder 128 defining the inner end of a slightly larger diameter axial bore 129. The outer portion of bore 129 terminates at a face surface 130 on the larger diameter end of the receiver 125.

The face 130 of the receiver 125 carries a series of longitudinally directed or axially projecting studs or bosses 131 adapted for attachment of an elongated nozzle portion 155 to the receiver 125. As shown, there are three studs 131 symmetrically spaced around the receiver face 130. An axial hole 132 in each stud receivers fasteners 133 for attachment of the dispenser nozzle portion 155. Adjacent the receiver face 130, the larger diameter end of the receiver 125 has a concentric cylindrical surface 134 for rotatably mounting the control valve 35.

The control valve component of the dispenser 120 is preferably identical with the control valve 35 of dispenser 20, as described above. Referring to FIG. 9, the control valve includes a hub 36 and elongated stem 37 fitting in receiver bore 129. One end (40a) of a spring 40 is engaged in a radial slot 38 in end surface 39. The opposite end (40b) of spring 40 is rotationally restricted by a notch or indentation (not shown in FIG. 9) in the bore shoulder 128. The axial duct 42 in stem 37 communicates with the diverging channels 43 terminating at supply ports 44 on the valve face 45 of the hub 36. A groove 46 and O-ring 47 seals the stem 37 within bore 129.

The nozzle portion 155 of the fluid dispenser 120, elongated to facilitate manual operation from a pull-down position, may be fabricated in two interconnecting elements. As shown in FIG. 8, the inner nozzle portion 155a has the same general configuration as the receiver component 25 described above and shown in FIGS. 1–5, and could be produced in the same mold for reasons of economy of tooling cost. The outer nozzle or tip portion 155b is preferably bullet shaped.

Whether of a two element construction as shown, or of a one piece construction, the nozzle portion 155 of dispenser 120 has a concentric cylindrical surface 156, similar to the receiver surface 134, for rotatably carrying or mounting the control valve 35. The discharge end 157 of the nozzle tip 155 has a small diameter aperture 158 communicating with a supply bore 159.

Radially inwardly of the surface 156, the face of the larger diameter end of nozzle 155 has a longitudinally inset circular valve seat 160 engaging the valve face 45 to constitute the rotary disk valve. Fluid under pressure passes from the receiver bore 129 through the valve ports 44 into matching radial slots 161 on the valve seat 160.

The slots 161 communicate with an axial bore 162 aligned with the nozzle tip bore 159.

Referring still to FIG. 9, the fastener 133 connecting the receiver 125 to the nozzle 155 may be a double barbed connector inserted in the receivers taps 132 and corresponding holes 163 in the nozzle surface facing the valve 35.

Figure 10:
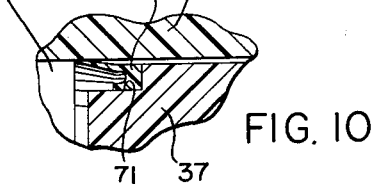

Referring to FIG. 10, for a fluid dispenser 20 or 120 utilized in high pressure application, the stem 37 of the control valve 35 could be sealed in the bore 29 or 129 by a cup seal 70 seated in a corresponding circumferential groove 71 around the end portion of the valve stem.

The preferred form of the invention and exemplary modifications have been shown and described in sufficient detail to enable one skilled in the art to practice the invention. Since additional modifications exist within the spirit of the invention, the scope of the invention should be limited solely by the scope of the attached claims.

What is claimed is:

1. A fluid dispenser comprising, a receiver having an axial bore adapted at one end for connection to a fluid supply line, a nozzle having an axial through bore attached to the second end of said receiver, a disk control valve rotatably mounted between said receiver and said nozzle, an axial hub at the center of said control valve, a stem at one end of said hub matingly engaging said axial bore in the second end of said receiver, means torsionally loading said control valve with respect to said receiver, a valve face at the second end of said hub having at least one port communicating with said axial bore in said receiver, a valve seat in said nozzle engaging said valve face and being radially slotted from said through bore for selective communication with said valve face port, and means for controlled rotation of said control valve.

2. A fluid dispenser according to claim 1 in which said means for controlled rotation of said control valve are a series of radial projections extending beyond the periphery of said receiver.

3. A fluid dispenser comprising, a receiver having an axial bore adapted at one end for connection to a fluid supply line, a nozzle having an axial through bore attached to the second end of said receiver, a disk control valve rotatably mounted between said receiver and said nozzle, an axial hub at the center of said control valve, a stem at one end of said hub matingly engaging said bore in the second end of said receiver, a torsionally loaded spring having one end rotationally restricted by a slot in said stem and a second end rotationally fixed within said receiver bore, a valve face at the second end of said hub having at least one port communicating with said bore in said receiver, a valve seat in said nozzle engaging said valve face and being radially slotted from said through bore for selective communication with said valve face port, and means for controlled rotation of said control valve.

4. A fluid dispenser control valve comprising, an axial hub, a stem extending axially from one end of said hub, a receiver, a receiver bore matingly housing said stem, a torsionally loaded spring having one end rotationally restricted by a slot in said stem and a second end rotationally fixed within said receiver bore, a valve face at the second end of said hub having at least one port communicating with said receiver bore, a nozzle attached to said receiver in fixed rotational relation, an axial through bore in said nozzle, a valve seat in one end of said nozzle matingly engaging said valve face, a slot in said valve seat extending outwardly from said through bore, and radial projections extending from said axial hub for manual rotation of said valve face and selective alignment of said valve face port with said valve seat slot.

5. A fluid dispenser control valve comprising, an axial hub, a stem extending axially from one end of said hub, a receiver, a receiver bore matingly housing said stem, a torsionally loaded spring having one end rotationally restricted by a slot in said stem and a second end rotationally fixed within said receiver bore, a valve face at the second end of said hub having at least one port, an axial duct extending through said stem into said hub, inclined channels connecting said axial duct and said port, a nozzle attached to said receiver in fixed rotational relation, an axial through bore in said nozzle, a valve seat in one end of said nozzle matingly engaging said valve face, a slot in said valve seat extending outwardly from said through bore, and radial projections extending from said axial hub for manual rotation of said valve face and selective alignment of said valve face port with said valve seat slot.

6. A fluid dispenser control valve comprising, an axial hub, a stem extending axially from one end of said hub, a receiver, a receiver bore matingly housing said stem, a torsionally loaded spring having one end rotationally restricted by a slot in said stem and a second end rotationally fixed within said receiver bore, a valve face at the second end of said hub having at least one port communicating with said receiver bore, a nozzle attached to said receiver in fixed rotational relation, an axial through bore in said nozzle, a valve seat in one end of said nozzle matingly engaging said valve face, a slot in said valve seat extending outwardly from said through bore, and radial projections extending from said axial hub for manual rotation of said valve face and selective alignment of said valve face port with said valve seat slot, said valve face and said valve seat having dissimilar frictional properties for smooth valve action.

7. A fluid dispenser comprising, an elongated receiver, an axial bore in said receiver, a fluid supply line, a solid linkage connector at the end of said supply line adapted to engage said bore at one end of said receiver, spaced longitudinal corrugations in the exterior surface of said receiver, an annular face at the second end of said receiver, rotational stops projecting axially from said annular face, a disk control valve engaging said annular face and said axial bore, an axil hub at the center of said control valve, a stem extending axially from one end of said hub and matingly engaging said axial bore, sealing means around the periphery of said stem, a radial slot in the end surface of said stem, a torsionally loaded spring having one end engaging said radial slot and a second end rotationally fixed within said axial bore, a circular valve face at the second end of said hub having at least one port, an axial duct extending through said stem into said hub, inclined channels connecting said axial duct and said port, a web extending radially outwardly from said hub, oblong arcuate slots in said web receiving said rotational stops, a rim extending axially from said web and engaging said face, radial projections extending outwardly from said rim for controlled rotation of said disk control valve, a tapered nozzle attached to said receiver in fixed rotational relation, a face at the first end of said nozzle engaging said rim, an axial through bore in said nozzle, a circular valve seat at said first end of said nozzle matingly engaging said valve face, a slot in said valve seat extending outwardly from said through bore for selective alignment with said valve face ports, and a blunted surface at the second end of said nozzle having a small dispensing aperture.

References Cited by the Examiner

UNITED STATES PATENTS

| | | | |
|---|---|---|---|
| 2,790,680 | 1/1955 | Rosholt | 239—394 |
| 2,893,683 | 6/1953 | Lane | 251—180 |

FOREIGN PATENTS 720,598  5/1942  Germany.

LOUIS J. DEMBO, *Primary Examiner.*